3,027,400
MANUFACTURE OF META- AND PARA-PHTHALIC ACID ESTERS
Art C. McKinnis, Long Beach, and William D. Schaeffer, Pomona, Calif., assignors to Union Oil Company of California, Los Angeles, Calif., a corporation of California
No Drawing. Filed Feb. 1, 1960, Ser. No. 5,631
11 Claims. (Cl. 260—475)

This invention relates to new methods for the mono-decarboxylation of trimellitic acid, or certain of its derivatives, to obtain mixtures of meta- and para-phthalic acid diesters to the substantial exclusion of o-phthalic acid esters and benzoic acid esters. Briefly, the method consists in heating a trimellitate reactant from the group consisting of trimellitic acid or its inner anhydride, or a mono-ester of either, to a temperature of about 170° to 310° C. in the presence of certain catalytic metal ions (e.g. copper or silver) while contacting the reacting mixture with an alcohol. Preferably, a strongly basic material such as an alkali metal hydroxide or tertiary amine is also included in the reaction mixture, as this is found not only to accelerate the reaction, but to increase the ratio of para-phthalic/meta-phthalic acid esters formed.

It is an important object of this invention to provide economical methods for the simultaneous mono-decarboxylation and esterification of trimellitic acid or its anhydride. It is another object to provide a decarboxylation method which can be operated at atmospheric pressure, thus avoiding the expense of high-pressure equipment. Another object is to effect a selective mono-decarboxylation of the trimellitate reactant in the 1- or 2-position, and still more preferentially in the 2-position, so that the product is mainly a para-phthalic acid diester. Still another object is to provide a continuous method for carrying out the decarboxylation, with continuous removal of the diesters as they are formed, whereby the catalyst and any basic material employed may be maintained in the reaction zone in an active state. These and other objects are achieved by the process herein described.

The present invention is based upon our discovery that trimellitic acid or its inner anhydride (II), when heated at moderate temperatures in the presence of a suitable catalyst and an alcohol, will decarboxylate preferentially in the 1- or 2-positions, as follows:

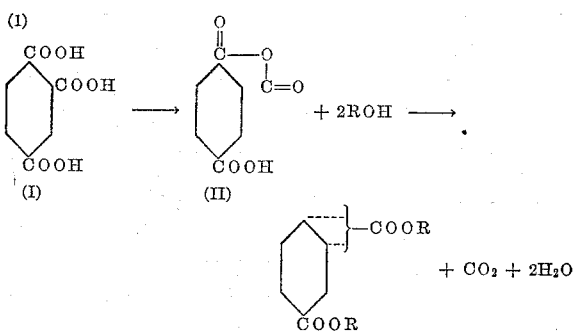

In the absence of alcohol, little or no decarboxylation occurs at the moderate temperatures employed, while at higher temperatures in the absence of alcohol the product is almost exclusively o-phthalic anhydride. At higher temperatures in the presence of alcohols, the formation of o-phthalic esters and benzoic acid esters becomes a significant factor. Essentially the same observations and results are obtained when the starting material is one of the following mono-esters:

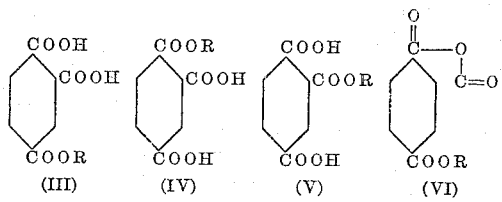

In all cases it is postulated that one or more of these compounds is an intermediate in the process, regardless of which starting material is used. In each case the final product is a mixture of dibasic acid esters wherein the ratio of para/meta isomers is about 40/60 to 50/50.

This isomeric ratio of the product esters may be considerably modified however by including in the reaction mixture a relatively strong base, which presumably interacts preferentially with the 1- and 4-carboxyl groups, thereby favoring decarboxylation in the 2-position. There is also a marked increase in the overall rate of decarboxylation and esterification. By using the strong base, the ratio of para/meta isomers may be increased to about 70/30 or higher. Also, due to its accelerating effect, even lower temperatures may be utilized, thereby substantially eliminating the formation of o-phthalic esters and benzoic acid esters.

The process may be carried out either batch-wise or continuously. A continuous operation is preferred, wherein alcohol and the trimellitate reactant are added continuously or incrementally to the hot reaction mixture, and vaporized dibasic acid esters, water, $CO_2$, and excess alcohol are continuously removed. The operative reaction temperatures range between about 170° and 310° C., preferably between about 200° and 280° C. At temperatures above 280° C., the formation of o-phthalic esters and benzoic acid esters becomes significant. At temperatures below the boiling point of the phthalate esters formed, an excess of the alcohol may be used to assist in sweeping the esters out of the reaction mixture. Other inert gases may also be used for this purpose, or reduced pressures may be employed.

It is normally preferable to employ a high-boiling solvent or diluent to facilitate contacting during the reaction. Suitable solvents include for example the phthalate diesters themselves, or other high-boiling esters, preferably of the same alcohol used in the reaction. Alternatively, we may use high-boiling ethers, alcohols, sulfones, N,N-dialkyl amides, or the like. Alcohols will of course become at least partially esterified with the phthalic acids, but this does not critically affect the process. A particularly useful class of alcohol solvents consists of the high-boiling mono-ethers of polyalkylene glycols, e.g. hexaethylene glycol mono-methyl ether, for the para-phthalic acid esters are quite soluble therein.

The reaction is preferably conducted at atmospheric pressure, but sub-atmospheric and super-atmospheric pressures are also contemplated. At atmospheric or sub-atmospheric pressures, the alcohol reactant may vaporize at the reaction temperature, but the solubility of the alcohols in the reaction mixture is sufficient that an adequate amount can be retained therein by continuously adding liquid or vaporized alcohol to the mixture. At super-atmospheric pressures, reaction rates are enhanced. Temperatures above about 310° C. generally result in lowering the amount of dissolved alcohol to a point which permits some decarboxylation to occur in the 4-position, unless super-atmospheric pressures are employed, or unless a high boiling alcohol is used.

We normally prefer to use lower alkanols in the reaction, e.g. methanol, ethanol, propanol, isopropanol, isobutanol, and the like. The lower alcohols form relatively volatile phthalate esters which may easily be vaporized or swept from the reaction mixture, and also these lower alkanol esters are normally desired in the principal industrial applications as solvents, intermediates for alkyd resins and the like. However, higher alcohols may also be used, e.g. hexyl, cyclohexyl, dodecyl, benzyl and the like, particularly where high-boiling esters for use as plasticizers and the like are desired. The high boiling esters may be recovered from the reaction mixture by vacuum distillation, steam distillation, solvent washing or the like. In general, any alkanol, cycloalkanol, or arylalkanol containing between 1 and about 20 carbon atoms may be utilized.

The operative catalysts for use herein comprise materials capable of yielding copper, silver, nickel, cadmium or thallium ions in the reaction mixture. This includes the oxides, hydroxides and salts of these metals. In general, the nature of the salt anion is immaterial, for in any case the operative catalyst is probably a trimellitate or phthalate salt of the catalyst metal. Suitable catalysts include for example cupric acetate, cupric sulfate, cupric naphthenate, cupric trimellitate, cupric chloride, cupric nitrate, cupric oxide, silver acetate, silver benzoate, silver naphthenate, silver trimellitate, silver chloride, silver nitrate, silver sulfide, silver oxide, nickel nitrate, nickel acetate, nickel trimellitate, cadmium hydroxide, cadmium acetate, cadmium trimellitate, thallium acetate, thallium hydroxide, thallium nitrate, thallium trimellitate and the like. Cuprous salts may also be used. The preferred catalysts are the copper and silver compounds, and especially copper. Nickel, cadmium and thallium are less active than copper or silver. Silver compounds are quite active, but tend to become reduced to the free metal. Any amounts of catalyst are operative to some extent, but preferably amounts between about 0.001% and 2% by weight, based on the trimellitate reactant, are used.

Other metal salts, including salts of gold, zinc and mercury have been tried, but were found to have little or no effect.

The preferred alkalis or bases to be used in conjunction with the foregoing catalysts are the alkali metal hydroxides, carbonates or other alkaline salts thereof, e.g. lithium hydroxide, sodium hydroxide, sodium carbonate, sodium trimellitate, potassium hydroxide, potassium carbonate, potassium trimellitate, rubidium hydroxide, rubidium carbonate, rubidium trimellitate, cesium hydroxide, cesium carbonate, cesium trimellitate, and the like, including the corresponding sulfides, acetates, phosphates, etc. The rubidium and cesium salts are especially preferred, for they are found to give the maximum ratio of para-/meta-phthalic esters. Other alkalis which may be used to less advantage than the alkali metal compounds, include the hydroxides, carbonates, sulfides, or other alkaline salts of the alkaline earth metals, and of the relatively alkaline transitional metals, particularly those of groups IB, IIB and VIII. Tertiary nitrogen bases are also found to be effective, e.g. pyridine, quinoline, trimethylamine, triethylamine, tributylamine, and the like. The nitrogen bases are however subject to the disadvantage of being volatile, and thus relatively difficult to maintain in the reaction zone and to separate from the product esters. Also, they sometimes tend to give a dark and/or tarry product.

Any amounts of the alkaline materials are effective in some degree, but optimum results are generally obtained by maintaining about 0.5 to 2 moles thereof in the reaction mixture per mole of unreacted trimellitate reactant.

The substantial absence of water during reaction is normally desirable, for if water is present free dibasic acids will be formed which are not volatile under the reaction conditions. However, water in the starting material is not harmful, since at atmospheric pressure, substantially all water is vaporized before reaction temperature is reached. Also, the conversion to trimellitic acid to its anhydride, with elimination of water, is usually complete before decarboxylation temperatures are reached. The water of esterification is insufficient to affect the reaction materially, especially where it is continuously removed with the product esters.

The following examples are cited to illustrate the invention, but should not be considered limiting in scope:

EXAMPLE I

To compare the effect of various catalysts, several batch experiments were carried out as follows:

To a 250 ml. 3-necked flask equipped with a reflux condenser was added about 20 grams of 4-carbomethoxy phthalic anhydride (the methyl ester of trimellitic acid anhydride), and the catalyst to be tested. The mixture was then heated to reaction temperature, and methanol was slowly added through the side-arm in small increments until sufficient $CO_2$ could be collected from the off-gases to measure the half-life of the trimellitate reactant. Methanol and product esters were continuously refluxed back into the reaction flask. At the end of each run, the reaction mixture was distilled to recover the product esters, which were then analyzed to determine the ratio of para- meta-phthalic esters formed. The results were as follows:

*Table 1*

| Run No. | Catalyst | Temp. °C. | Half-life,[1] Minutes | Yield of m- and p-phthalic esters [2] | Percent p-phthalic ester in m-, p- mixture |
|---|---|---|---|---|---|
| 1 | None | 290 | ([3]) | 0 | |
| 2 | 0.2 g. CuAc$_2$H$_2$O | 260 | 50 | 95+ | 46 |
| 3 | 0.1 g. Ni(NO$_3$)$_2$·6H$_2$O | 290 | 90 | 95+ | 48 |
| 4 | 0.2 g. AgNO$_3$ | 290 | 30 | 95+ | 53 |
| 5 | 0.2 g. TlAc | 290 | 80 | 95+ | 48 |
| 6 | 0.2 g. AuCl$_3$ | 290 | | 0 | |

[1] Reaction is zero order; hence half-life of trimellitate reagent is equal to one-half the time required for complete reaction.
[2] Based on trimellitate reactant consumed.
[3] After one hour of heating, substantially the only product was a small quantity of trimellitic acid esters. No decarboxylation occurred.

It is hence apparent that, at moderate temperatures, the catalysts of this invention are capable of effecting a substantially complete conversion to dibasic acid esters in about 1-2 hours, while in the absence of a catalyst, no decarboxylation occurs.

The 4-carbomethoxy phthalic anhydride used in this example was prepared by heating trimellitic acid anhydride at atmospheric pressure and 270-320° C. while adding methanol in small increments under a reflux condenser which allowed $H_2O$ and excess methanol to escape. Under these conditions (in the absence of a catalyst) there is no decarboxylation, and there is no appreciable esterification beyond the mono-ester stage.

EXAMPLE II

To evaluate the effect of added alkaline materials, several additional runs were carried out in a manner analogous to that of Example I, but employing in each case 20 grams of trimellitic acid anhydride instead of the monoester. The results were as follows:

Table 2

| Run No. | Catalyst and Base | Temp. °C. | Half-life,¹ Minutes | Yield of m- and p-phthalic esters | Percent p-phthalic ester in m-, p-mixture |
|---|---|---|---|---|---|
| 7 | 0.2 g. Cu(Ac)₂ / 1 g. Na₂CO₃ | 220 | 30 | 95+ | 61 |
| 8 | 0.2 g. Cu(Ac)₂ / 1 g. K₂CO₃ | 230 | 30 | 95+ | 66 |
| 9 | 0.2 g. Cu(Ac)₂ / 6.5 g. Rb₂CO₃ | 220 | 20 | 95+ | 73 |
| 10 | 0.2 g. Cu(Ac)₂ / 9 g. Cs₂CO₃ | 225 | 14 | 95+ | 74 |
| 11 | 0.2 g. Cu(Ac)₂ / 0.2 g. Cd(OH)₂ | 290 | 90 | 85 | 65 |
| 12 | 0.2 g. Tl(Ac)₂ / 0.2 g. Cd(OH)₂ | 290 | 90 | 85 | 59 |
| 13 | 0.2 g. Cu(Ac)₂ / 0.5 ml. (n-C₄H₉)₃N | 210 | 90 | 75 | 57 |
| 14 | 0.2 g. Cu(Ac)₂ / 1 ml. quinoline | 220 | 60 | 75 | 58 |
| 15 | 0.2 g. Cu(Ac)₂ / 3 ml. (CH₃)₃N | 220 | 50 | 85 | 57 |
| 16 | 0.1 g. Cu(Ac)₂ / 15 ml. pyridine | 215 | 40 | 80 | 73 |
| 17 | 0.1 g. Cu(O Ac)₂ / 15 ml. pyridine | 210 | 50 | 80 | 61 |
| 18 | 15 ml. pyridine | 210 | | 0 | |

From the foregoing data, it will be observed that the addition of an alkali gives markedly increased reaction rates, even at temperatures considerably lower than those of Example I. The proportion of p-phthalic acid esters in the product is also markedly increased. Runs 9 and 10 show the superiority of cesium and rubidium compounds, as compared to sodium or potassium. Runs 11 and 12 show that cadmium hydroxide, even in small amounts, materially increases the ratio of para-/meta-esters formed. Runs 13–17 demonstrate the efficacy of nitrogen bases, and run No. 18 shows that the nitrogen bases alone are ineffective.

EXAMPLE III

A continuous run was carried out as follows: Into a 1 liter reaction flask equipped with a stirrer, dropping funnel and heated vapor outlet line, was placed 13.8 grams of $K_2CO_3$, 0.2 grams Cu(acetate)₂, 100 grams of dimethyl isophthalate (solvent), and 19 grams of trimellitic acid anhydride. A separate feed mixture was prepared by disolving 190 grams of trimellitic acid anhydride in 1 liter of methanol. The contents of the reaction flask were then heated to about 235° C., and the feed mixture was admitted through the dropping funnel at the rate of about 1 ml. per minute. The vaporized product plus carbon dioxide and excess methanol was continuously taken off and condensed into a product receiver. The total yield of meta- and para-phthalic acid dimethyl esters was about 95 percent, based on trimellitic acid anhydride consumed. The ratio of para-/meta-esters was about 63/37.

It is thus apparent that the process of this invention provides a simple and economical method for converting trimellitic acid to the diesters of meta- and para-phthalic acids. It is not intended that the invention should be limited to the details described above. Other catalysts, bases, and alcohols within the purview of this specification can be substituted in the above examples to obtain analogous results as to conversions, yields, reaction velocities and isomeric product distribution. The true scope of the invention is intended to be embraced by the following claims:

We claim:

1. A method for the manufacture of diesters of meta- and para-phthalic acids, which comprises heating a trimellitic acid reactant in the presence of an alcohol and a decarboxylation catalyst at a reaction temperature between about 170° and 310° C. to effect esterification and mono-decarboxylation with resultant production of a mixture of the diesters of meta- and para-phthalic acids with said alcohol, said catalyst being a compound capable of yielding ions of a metal selected from the class consisting of copper, silver, nickel, cadmium and thallium, said trimellitic acid reactant being selected from the class consisting of trimellitic acid, monoesters of trimellitic acid, trimellitic acid anhydride and monoesters of trimellitic acid anhydride, and said alcohol being selected from the class consisting of alkanols, cycloalkanols and arylalkanols of 1 to 20 carbon atoms.

2. A method as defined in claim 1 wherein said catalyst is a copper compound.

3. A method as defined in claim 1 wherein said alcohol is a lower alkanol.

4. A method as defined in claim 1 wherein said heating is carried out at substantially atmospheric pressure.

5. A method as defined in claim 4 wherein said alcohol is a lower alkanol and is added continuously to the reaction mixture during said heating, and wherein product diesters are continuously vaporized from the reaction mixture.

6. A method for the manufacture of diesters of meta- and para-phthalic acids, which comprises heating a trimellitic acid reactant in the presence of (1) an alcohol selected from the class consisting of alkanols, cycloalkanols and araylkanols of 1 to 20 carbon atoms, (2) a decarboxylation catalyst, and (3) an added alkaline material selected from the class consisting of tertiary nitrogen bases and the oxides, hydroxides and alkaline salts of the alkali metals, at a reaction temperature between about 170° and 310° C. to effect esterification and mono-decarboxylation with resultant production of a mixture of the diesters of meta- and para-phthalic acids with said alcohol, said mixture predominating in p-phthalic esters, said catalyst being a compound capable of yielding ions of a metal selected from the class consisting of copper, silver, nickel, cadmium, and thallium, and said trimellitic acid reactant being selected from the class consisting of trimellitic acid, monoesters of trimellitic acid, trimellitic acid anhydride and monoesters of trimellitic acid anhydride, the concentration of said alkaline material in the reaction mixture being maintained at a value below about 2 moles thereof per mole of unreacted trimellitate reactant.

7. A method as defined in claim 6 wherein said alkaline material is selected from the class consisting of the oxides, hydroxides and alkaline salts of rubidium and cesium.

8. A method as defined in claim 6 wherein said catalyst is a copper compound.

9. A method as defined in claim 6 wherein said alcohol is a lower alkanol.

10. A method as defined in claim 6 wherein said heating is carried out at substantially atmospheric pressure.

11. A method as defined in claim 10 wherein said alcohol is a lower alkanol and is added continuously to the reaction mixture during said heating, and wherein product diesters are continuously vaporized from the reaction mixture.

References Cited in the file of this patent

UNITED STATES PATENTS 2,864,854    McKinnis _____ Dec. 16, 1958

OTHER REFERENCES

Fieser and Fieser: Organic Chemistry, 3rd Ed., page 178 (1956).

Noller: Chemistry of Organic Compounds, 2nd Ed., page 170 (1957).

Gould: Structure and Mechanism in Organic Chemistry, pages 314–15, 342–53 (1959).